United States Patent [19]
Szymanski et al.

[11] Patent Number: 4,874,586
[45] Date of Patent: Oct. 17, 1989

[54] BAGHOUSE BAG DESIGN FOR SIMULTANEOUS PARTICULATE CAPTURE AND CHEMICAL REACTION

[75] Inventors: Thomas Szymanski, Stow, Ohio; Stephen M. Turner, Richmond, Tex.

[73] Assignee: Norton Company, Worcester, Mass.

[21] Appl. No.: 128,558

[22] Filed: Dec. 3, 1987

[51] Int. Cl.$^4$ ............................................. B01D 46/02
[52] U.S. Cl. .................... 422/177; 422/188; 422/211; 422/238; 422/239; 55/380; 55/381; 55/382
[58] Field of Search ............... 422/164, 168, 169, 177, 422/188, 211, 238, 239, 240; 55/98, 361, 365, 380 K, 381, 382, 524

[56] References Cited

U.S. PATENT DOCUMENTS

| | | | |
|---|---|---|---|
| 3,596,441 | 8/1971 | Lundahl | 55/380 X |
| 3,816,977 | 6/1974 | Gordon et al. | 55/380 X |
| 3,826,066 | 7/1974 | Higgins | 55/380 X |
| 3,853,508 | 12/1974 | Gordon et al. | 55/380 X |
| 4,220,633 | 9/1980 | Pirsh | 55/97 X |
| 4,289,855 | 9/1981 | Whitley | 422/211 X |
| 4,309,386 | 1/1982 | Pirsh | 422/177 |
| 4,728,503 | 3/1988 | Iida et al. | 55/382 X |

Primary Examiner—Barry S. Richman
Assistant Examiner—Lynn M. Kummert
Attorney, Agent, or Firm—Arthur A. Loiselle, Jr.

[57] ABSTRACT

Bag for receiving a gas stream containing solid particulate and undesirable gaseous components, consisting of inner and outer tubular porous walls arranged coextensively to define a space between them, which space is divided at discrete intervals into compartments containing solid particles of chemical to treat the gaseous components.

3 Claims, 2 Drawing Sheets

BAGHOUSE BAG DESIGN FOR SIMULTANEOUS PARTICULATE CAPTURE AND CHEMICAL REACTION

BACKGROUND OF THE INVENTION

Many industrial processes produce flue gas streams which require particulate removal and/or catalytic tailgas clean-up prior to releasing them to the atmosphere. A typical example would be a coal fired power plant in which the fly ash must be removed prior to the exhaust gas leaving the smoke stack. The increased public awareness of the "acid rain" problem has increased the desire to reduce acid rain forming flue gas components such as sulfur oxides ($SO_x$) and nitrogen oxides ($NO_x$) from the exhaust gas as well as the fly ash. In fact, several European countries have instituted mandatory $SO_x$ and $NO_x$ controls.

The current method of removing particulates such as fly ash as well as gaseous pollutants such as $NO_x$ employs several different processes in series. If one, for example, combines the separate processes of particulate and $NO_x$ removal into one, it obviously offers distinct advantages in terms of size, ease of retrofitting, etc.

We have discovered an improved bag design for use in a hot baghouse. This discovery, for example, allows the simultaneous removal of particulates such as fly ash and, with the addition of ammonia and a selective catalytic reduction (SCR) catalyst, $NO_x$.

Pirsch teaches in U.S. Pat. No. 4,220,633 a process for the simultaneous removal of $NO_x$ and particulate matter from a gas stream where the catalyst may be incorporated into or onto the filter fabric. This is a costly process and the necessity of frequent cleaning of filter bags and their dusty process environment can lead to catalyst being removed from the bag.

DESCRIPTION OF THE INVENTION

Our discovery involves a novel and inexpensive catalytic filter bag. This invention consists of two bags, one inside the other, attached to each other by any method known to those skilled in the art such as stitching, stapling, adhesives, solvent welding, snaps, zippers, etc. The channels so formed can be varied in size by appropriate adjustment of the bags and seam widths. After manufacture and prior to installation the bags can be filled with the catalyst specific for the reaction desired. The catalyst can be in any shape such as powder, granules, extrudates, tablets, spheres, rings, discs, or other shapes known to those skilled in the art.

The bags of this invention are easily manufactured and filled with catalyst for the intended applications. Examples of such catalysts and applications are well known by those skilled in the art. Two typical examples would be the selective catalytic reduction of $NO_x$ using ammonia and the catalytic incineration of carbon monoxide (CO) and lower hydrocarbons. The bags of this invention are not limited to these two examples and are of broad utility.

The bags may be constructed of woven wire, fiberglass cloth, woven or non-woven polymeric and/or ceramic fibers, or other suitable fabrics capable of withstanding the temperatures of the flue gas and processing conditions. Thus, the bags of this invention allow the simultaneous removal of particulates as well as the potential to remove gaseous contaminants such as $NO_x$. This invention yields a more compact total installation as it eliminates the need for one or more pieces of process equipment.

Figures 1, 2:
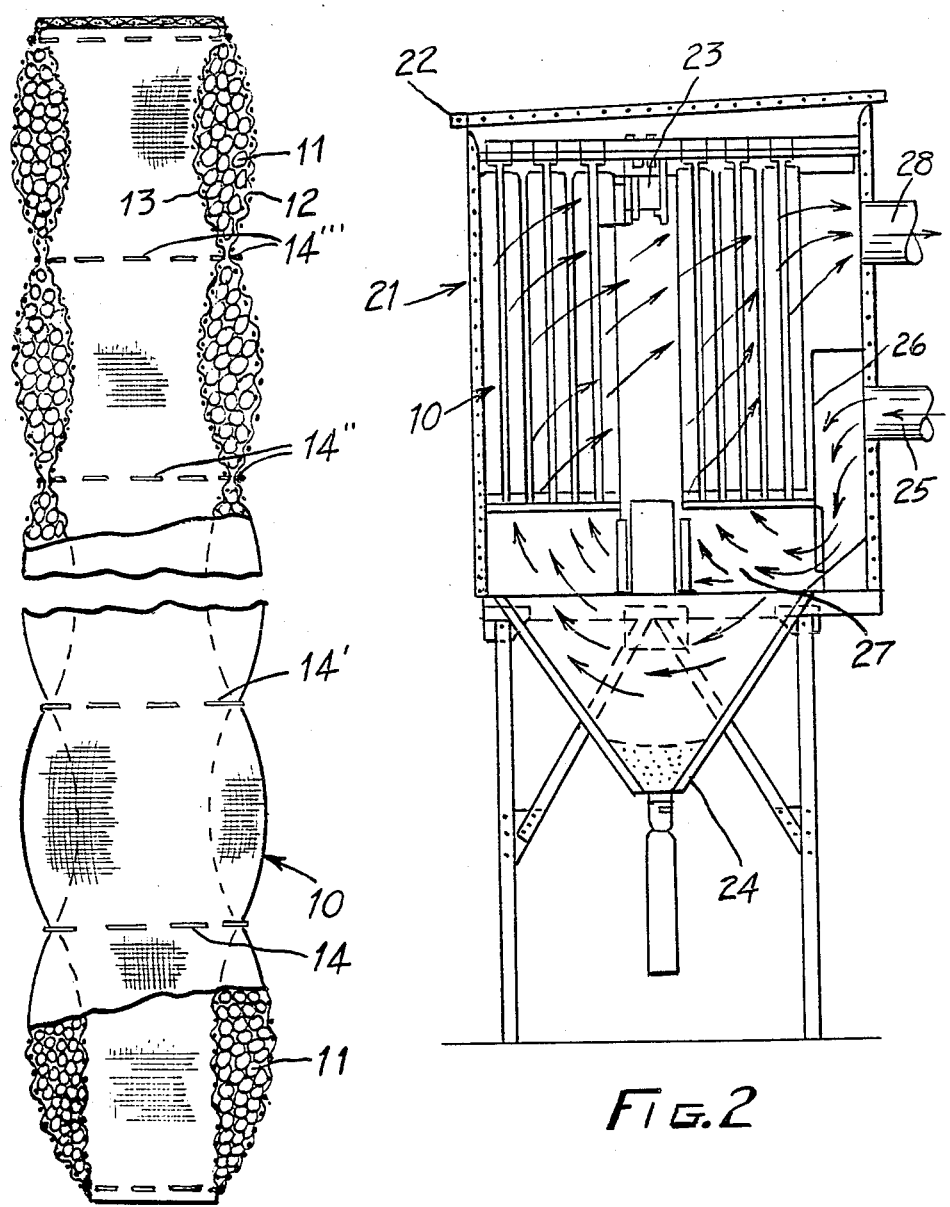
FIG. 1 is a side view, partly in cross-section, of a filter bag of the invention.
FIG. 2 is a cross-sectional view to show the construction of a baghouse employing filter bags of the present invention.

FIG. 1 shows a bag 10 of the invention in a tubular form, partly in cross-section. Catalyst pellets 11 are contained between outer wall 12 and inner wall 13. Compartments are formed by attaching the walls together at spaced distances along its axis as shown at 14, 14', 14" and 14''', etc. If desired, longitudinal attachment or stitching may be employed to further compartmentalize the space between the walls.

FIG. 2 shows a conventional baghouse except for the use of the bags of this invention and illustrates how the bags of the present invention can be employed. The bags 10 are enclosed in a housing 22. The bags supported at their tops by mechanism 23 which is adapted to shake the bags periodically to remove the dust collected, which is removed from the bottom of hopper 24. The inlet gas enters inlet pipe 25, baffle 26 diverts the inlet air into annular headers 27 to which the insides of the bags 10 are exposed. The cleaned air exits the outside wall of the bags and then exits the outlet pipe 28.

Figures 3, 4:
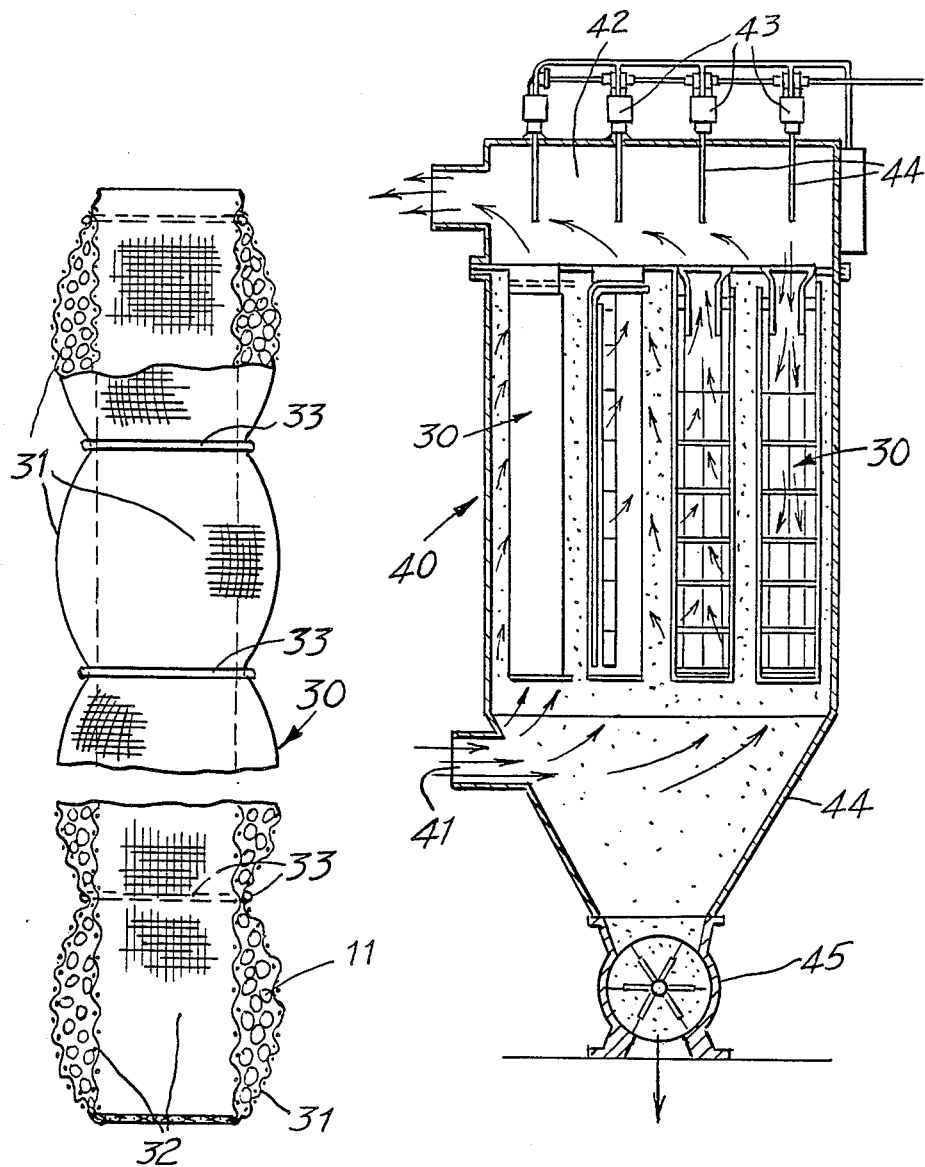
FIG. 3 is a view, like FIG. 1, of a modified form of the bag of the present invention.
FIG. 4 is a vertical sectional view of a baghouse incorporating the bag shown in FIG. 3.

FIG. 3 shows a slightly modified type of bag 30 designed for use in a baghouse where the flow through the bag is outside-in, as illustrated in FIG. 4. The outer wall 31 of bag 30 is of fine mesh, suitable for the filtration application while the inner wall 32 is relatively stiff and has meshes coarse enough to retain the catalyst, and stiff enough to maintain the geometry of the bag against gas pressure from the outside. In addition, the compartments for the catalyst may be formed by, for example, wrapping and tying a cord 33 around the outside of the bag as each section of the bag is filled with particulate catalyst before installation in the baghouse.

FIG. 4 shows a baghouse or bag filter assembly suitable for the bags 30 of FIG. 3. The gas enters inlet 41, goes through first the outer wall of bags 30 and exits the header 42 at the top of the assembly to which open ends of the bags communicate. The bottom ends of the bags are obviously closed. The dust may be periodically removed from the bags by pulsing compressed air through valves 43 and nozzles 44. The dust is collected in hopper 44 and can be removed by operation of valve 45.

What is claimed is:

1. Bag for use in removing particulate from a gas stream and simultaneously treating undesirable gaseous components of the gas stream, comprising:
   (a) a first tubular porous wall,
   (b) a second tubular porous wall mounted in telescoping, coextensive relationship inwardly of the first tubular wall to define a space between the two walls,
   (c) means located at substantial longitudinal intervals between the tubular walls to divide the space into a plurality of discrete compartments, (d) solid particles of chemical contained in each of the compartments, the chemical particles acting to treat an undesirable gaseous component, wherein passage of a gas stream laterally through the tubular walls and space therebetween initially encounters the first wall and deposits particulate thereon, the gas stream subsequently passing through the particles of chemical and the second wall.

2. Bag as recited in claim 1, wherein the first wall is provided with fine pores of a dimension that will not pass the solid particles of chemical particulate, but will pass the gas stream.

3. Bag as recited in claim 1, wherein one of the walls is formed of a relatively stiff fabric which lends physical strength to the bag, while the other wall is made of a material which is relatively flexible to facilitate the formation of the compartments.

* * * * *